United States Patent

[11] 3,626,002

[72] Inventors Edward G. Daniels
Portage;
Le Roy E. Johnson, Kalamazoo Township,
Kalamazoo County; Floyd P. Kupiecki,
Portage; Paul F. Wiley, Texas Township,
Kalamazoo County, all of Mich.
[21] Appl. No. 484,086
[22] Filed Aug. 31, 1965
[45] Patented Dec. 7, 1971
[73] Assignee The Upjohn Company
Kalamazoo, Mich.

[54] β-CARBOXYACRYLAMIDINE
12 Claims, No Drawings
[52] U.S. Cl. .................................................. 260/534 R,
195/47, 260/253, 260/295, 260/295.5,
260/501.11, 424/253, 424/266, 424/316, 424/319
[51] Int. Cl. ............................................. C07c 123/00

[50] Field of Search........................................... 260/534,
501

[56] References Cited
UNITED STATES PATENTS
2,851,490  9/1958  Godt, Jr. et al. ............... 260/534
2,955,136  10/1960  Sullivan et al. ............... 260/537
OTHER REFERENCES
Katsev et al., Chemical Abstracts Vol. 56: 12,727, (1962)

Primary Examiner—Lorraine A. Weinberger
Assistant Examiner—Robert Gerstl
Attorney—George T. Johannesen ABSTRACT: New compounds cis-β-carboxyacryl-amidine and trans-β-carboxyacrylamidine and processes for preparing the same. These compounds can be used as antifungal agents against Blastomyces dermatitides and Coccidioides immitis.

β-CARBOXYACRYLAMIDINE

This invention relates to novel compositions of matter and to processes for the production thereof. More particularly, This invention relates to the new compounds cis-β-carboxyacrylamidine (I) and trans-β-carboxyacrylamidine (II) and to processes for the production thereof.

The novel compounds of this invention have the following structural formulas:

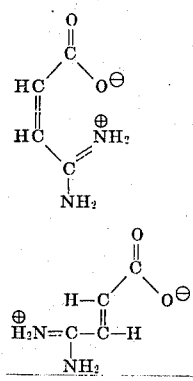

cis-β-Carboxyacrylamidine (I) (U-20,904) is a biosynthetic product produced by culturing a cis-β-carboxyacrylamidine-producing actinomycete in an aqueous nutrient medium. trans-β-Carboxyacrylamidine (II) (U-18,202) is produced by treating cis-β-carboxyacrylamidine (I) with a strong mineral acid.

The novel compounds of the invention are amphoteric substances which have the property of adversely affecting the growth of fungi. For example, they inhibit the growth of the fungi *Blastomyces dermatitides* and *Coccidioides immitis*. They also have the property of being cytotoxic in that they are active against KB cells (human epidermoid cancer cells) in tissue culture.

THE MICRO-ORGANISM

The actinomycete used according to this invention for the production of cis-β-carboxyacrylamidine has been designated as *Streptomyces furlongus* var. *furlongus* nov. sp. One of its strain characteristics is the production of cis-β-carboxyacrylamidine. A subculture of the living organism can be obtained from the permanent collection of the Northern Utilization and Research Division, Agricultural Research Service, U.S. Department of Agricultural, Peoria, Illinois, U.S.A. Its accession number in this repository is NRRL 3192.

The characteristics of *Streptomyces furlongus* var. *furlongus* nov. sp., NRRL 3192, are given in the following tables:

TABLE I

Appearance O Ektachrome

| Agar Medium | S. furlongus v. furlongus |
|---|---|
| Bennett's | Gray aerial growth. Brown reverse. |
| Czapek's Sucrose | Gray aerial growth. Pale brown reverse. |
| Maltose Tryptone | Blue-gray aerial growth. Brown reverse. |
| Peptone-Iron | No aerial growth. Brown reverse. Melanin +. |
| 0.1% Tyrosine | Gray aerial growth. Brown reverse. |
| Casein Starch | Gray-blue aerial growth. Brown reverse. |

*Dietz, A. "Ektachrome Transparencies as Aids in Actinomycete Classification," Annals of the N.Y. Academy of Sciences 60: 152–154, 1954.

TABLE II

Assimilation of Carbon Compounds in Synthetic Medium (J. Bact. 56: 107–114, 1948)

|  | S. furlongus v. furlongus |
|---|---|
| Control | (+) |
| 1. D-xylose | + |
| 2. L-arabinose | + |
| 3. rhamnose | + |
| 4. D-fructose | + |
| 5. D-galactose | + |
| 6. D-glucose | + |
| 7. D-mannose | + |
| 8. maltose | + |
| 9. sucrose | (+) |
| 10. lactose | + |
| 11. cellobiose | + |
| 12. raffinose | + |
| 13. dextrin | + |
| 14. inulin | (+) |
| 15. soluble starch | + |
| 16. glycerol | + |
| 17. dulcitol | (+) |
| 18. D-mannitol | + |
| 19. D-sorbitol | (+) |
| 20. inositol | (+) |
| 21. salicin | − |
| 22. phenol | − |
| 23. cresol | − |
| 24. Na formate | − |
| 25. Na oxalate | (−) |
| 26. Na tartrate | (+) |
| 27. Na salicylate | (−) |
| 28. Na acetate | (+) |
| 29. Na citrate | + |
| 30. Na succinate | + |

+ = positive assimilation
(+) = positive assimilation—slight growth
(−) = slight growth—no assimilation
− = no growth

TABLE III

Cultural Characteristics

| Medium | S. furlongus v. furlongus |
|---|---|
| Peptone-iron Agar | Blue-gray aerial growth. Brown reverse. Brown pigment. Melanin positive. |
| Calcium Malate Agar | Trace gray-white aerial growth. Colorless reverse. No pigment. Malate not solubilized. |
| Glucose Asparagine Agar | Gray-pink aerial growth. Brown-tan reverse. Tan pigment. |
| Skim Milk Agar | Gray-pink aerial growth on periphery. Brown-tan reverse. Tan pigment. Casein not (or very slightly) solubilized under growth. |
| Tyrosine Agar | Gray-pink aerial growth. Brown reverse. Brown pigment. Tyrosine solubilized. |
| Xanthine Agar | Pale gray-pink aerial growth. Pale yellow-tan reverse. Pale yellow-tan pigment. Xanthine not solubilized. |
| Nutrient Starch Agar | Pale gray-pink aerial growth. Yellow reverse. Yellow pigment. Starch hydrolyzed. |
| Yeast Extract— Malt Extract Agar | Blue-gray aerial growth Brown reverse. Tan pigment. |
| Bennett's Agar | |

| | |
|---|---|
| 18° C. | Heavy gray aerial growth on periphery. Tan reverse. Tan pigment. |
| 24° C. | Heavy gray with trace blue aerial growth. Olive-tan reverse. Olive-tan pigment. |
| 28° C. | Good blue-gray aerial growth Tan-brown reverse. Tan-brown pigment. |
| 37° C. | Heavy gray aerial growth. Red-tan reverse. Red-tan pigment. |
| 55° C. | Good vegetative growth at 18 hours. |
| Czapek's Sucrose Agar | |
| 18° C. | Fair gray aerial growth. Gray reverse. No pigment. |
| 24° C. | same as at 18° C. |
| 28° C. | Same as at 18° C. |
| 37° C. | Same as at 18° C. |
| 55° C. | Good vegetative growth at 18 hours. |
| Maltose-Tryptone Agar | |
| 18° C. | Cream-tan aerial growth Tan reverse. Tan pigment. |
| 24° C. | Heavy gray-blue aerial growth. Blue-tan reverse. Tan pigment. |
| 28° C. | Heavy blue-gray aerial growth. Blue-brown reverse. Tan pigment. |
| 37° C. | Heavy gray aerial growth flecked with tan Red-tan reverse. Red-tan pigment. |
| 55° C. | Good vegetative growth at 18 hours. |
| Litmus Milk | Gray aerial growth on surface ring. Peptonization. Reduction. pH 7.6. |
| Plain Gelatin | White aerial growth on surface. Brown pigment in ¼ of medium. Liquefaction in pigment area. |
| Nutrient Gelatin | Cream-gray aerial growth on surface. Brown pigment in ¼ of medium. Liquefaction in pigment area. |
| Nutrient Nitrate Broth | White aerial growth on surface pellicle. Trace colorless vegetative growth at base. Tan pigment. Nitrate not reduced to nitrite. |
| Synthetic Nitrate Broth | White aerial growth on surface pellicle. Pale tan vegetative growth at base. Trace pale tan pigment. Nitrate reduced to nitrite. |

TABLE IV

Color Characteristics

| Agar Medium | S. furlongus v. furlongus | |
|---|---|---|
| | Color Harmony Manual 3rd Ed. | ISCC–NBS Color Names |
| Bennett's Surface | a white | 263gm white |
| | 15ea light blue, baby blue, light horizon blue, light sky blue | 171g very light greenish blue |
| | | 184m very pale blue |
| | 3ig beige brown, mist brown | 80m grayish yellowish brown |
| | | 95g moderate olive brown |
| Reverse | 3ng yellow maple | 77m moderate yellowish brown |
| Pigment | 2pg(m) mustard gold | 94gm light olive brown |
| Czapek's Sucrose Surface | 2gc bamboo, chamois | 90gm grayish yellow |
| Reverse | 2ec biscuit, ecru, oatmeal, sand | 90gm grayish yellow |
| Pigment | none | |
| Maltose-Tryptone Surface | c light gray 15ca pale blue | 264gm light gray — |
| Reverse | 3pi golden brown, tobacco brown | 75g deep yellowish brown 77m moderate yellowish brown |
| Pigment | 3ne topaz, butterscotch | 72m dark orange yellow 74g strong yellowish brown |

TABLE V

Microscopic Characteristic

| | S. furlongus v. furlongus |
|---|---|
| Light Microscope | RF short |
| Electron Microscope Direct | Irregular, beadlike Smooth. |
| Carbon Replica | Irregular with surface ridging. | cis-$\beta$-Carboxyacrylamidine (I) is produced when the elaborating organism is grown in an aqueous nutrient medium under submerged aerobic conditions; for the preparation of limited amounts, surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, galactose, dextrin, molasses, and the like. Preferred nitrogen sources include corn steep liquor, yeast, autolyzed brewer's yeast with milk solids, soybean meal, cottonseed meal, corn meal, milk solids, pancreatic digest of casein, distiller's solubles, fish meal, animal peptone liquors, meat and bone scraps, and the like. A combination of these carbon and nitrogen sources can be used advantageously. Trace metals, for example, zinc, magnesium, manganese, cobalt, iron, and the like need not be added to the fermentation since tap water and unpurified ingredients are used as media components.

Production of the compound of the invention can be effected at any temperature conducive to satisfactory growth of the micro-organism for example, between about 18° and 40° C. and preferably between about 25° and 30° C. Ordinarily, optimum production of the compound is obtained in about 2 to 10 days. The medium normally stays fairly close to neutral, or on the acid side during the fermentation. The final pH is dependent, in part, on the buffers present, if any, and in part on the initial pH of the culture medium which is advantageously adjusted to about pH 6–8 prior to sterilization.

When growth is carried out in large vessels and tanks, it is preferable to use the vegetative form, rather than the spore form, of the micro-organism for inoculation to avoid a pronounced lag in the production of the new compound and the attendant inefficient utilization of equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound, as long as it is such that a good growth of the micro-organism is obtained.

cis-β-Carboxyacrylamidine (I) is an amphoteric compound having the empirical formula $C_4H_6N_2O_2$. It is relatively insoluble in the common organic solvents, e.g., amyl acetate, butanol, methylene chloride; slightly soluble in hot water; and readily soluble in 0.1 N hydrochloric acid and 0.1 N sodium hydroxide.

cis-β-Carboxyacrylamidine (I) can be recovered from the culture medium by the use of absorptive techniques. In a preferred process, cis-β-carboxyacrylamidine (I) is recovered from its culture medium by separation of the mycelium and undissolved solids by conventional means such as by filtration or centrifugation. The antibiotic is then removed from the filtered or centrifuged broth by the use of activated carbon. After the antibiotic is adsorbed on the carbon, acetone can be used as the eluting agent. The eluates obtained from the carbon column can be evaporated to dryness to provide an impure preparation of cis-β-carboxyacrylamidine (I). This preparation can be used in environments where higher purity of cis-β-carboxyacrylamidine (I) is not necessary.

High purity cis-β-carboxyacrylamidine (I) can be obtained by subjecting an impure dry preparation of cis-β-carboxyacrylamidine (I), as obtained above, to further absorption on an activated carbon column. Elution of the antibiotic from this second carbon column absorption can be accomplished by the use of varying concentrations of acetone. The eluates from the column can be concentrated under reduced pressure at which time the cis-β-carboxyacrylamidine (I) crystallizes.

Since cis-β-carboxyacrylamidine (I) and trans-β-carboxyacrylamidine (II) are amphoteric substances, they form salts with acids, alkali metals, alkaline earth metals, and amines. Metal salts can be prepared by dissolving cis-β-carboxyacrylamidine (I) or trans-β-carboxyacrylamidine (II) in water, adding a dilute metal base until the pH of the solution is about 7 to 8, and freeze-drying the solution to provide a dried residue of the cis-β-carboxyacrylamidine (I) or trans-β-carboxyacrylamidine (II) metal salt. Such metal salts include the sodium, potassium, and calcium salts. Amine salts, including those with organic bases, such as primary, secondary, and tertiary mono-, di-, and polyamines can also be formed using the above-described or other commonly employed procedures. Other salts are obtained with therapeutically effective bases which impart additional therapeutic effects thereto. Such bases are, for example, the purine bases such as theophylline, theobromine, caffeine, or derivatives of such purine bases; antihistaminic bases which are capable of forming salts with weak acids; pyridine compounds such as nicotinic acid amide, isonicotinic acid hydrazide, and the like; phenylalkylamines such as adrenalin, ephedrine, and the like; choline, and others.

Acid salts of cis-β-carboxyacrylamidine (I) or trans-β-carboxyacrylamidine (II) can be made by neutralization with the appropriate acid to below about pH 7.0, and advantageously to about pH 2 to pH 6. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenyl-salicylic, 3-methylglutaric, ortho-sulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, dimethyldithiocarbamic, sorbic, monochloracetic, undecylenic, 4'-hydroxyazobenzene-4-sulfonic, octadecylsulfuric, picric, benzoic, cinnamic, and like acids.

trans-β-Carboxyacrylamidine (II) is produced upon acidic treatment of cis-β-carboxyacrylamidine (I) with a strong mineral acid, i.e., 1 to 6 N acid. Acidic treatment of cis-β-carboxyacrylamidine (I) at room temperature gives trans-β-carboxyacrylamidine (II) which is useful in the same manner as cis-β-carboxyacrylamidine (I). The isomerization reaction can be effected, advantageously, with a mineral acid, for example, hydrochloric acid, sulfuric acid, and the like. Heat can be employed, advantageously, to reduce the reaction time. The isomerization product can be recovered from the reaction mixture by adjusting the reaction mixture to a pH of about 4–5 with a base, for example, sodium hydroxide, and then allowing the crystalline precipitate of trans-β-carboxyacrylamidine (II) to form.

The novel compounds of the invention have antifungal activity against the following fungi:
*Blastomyces dermatitides*
*Coccidioides immitis*
*Hormodendrum compactum*
*Nocardia asteroides*
*Geotrichium sp.*
*Cryptococcus neoformans*
*Sporotrichum schenkii*
*Trichophyton rubrum*
*Microsporum canis*
*Candida albicans* (Abbott)
*Trichophyton violaceum*
*Trichophyton asteroides*
*Trichophyton mentagrophytes*

Thus, since the novel compounds of the invention are active against *C. neoformans*, they can be used to treat pigeon roosts to inhibit this fungus which has been found in pigeon droppings. (Journal of The American Medical Association, Vol. 191, No. 4, Jan. 25, 1965, pp. 269–274.) The novel compounds of the invention can also be used as the antifungal agents in the shoe uppers disclosed in U.S. Pat. No. 3,130,505. Furthermore, the novel compounds of the invention can be used to swab laboratory benches and equipment in a mycological laboratory.

The new compounds of the invention are active against KB cells in tissue culture and, thus, they can be used for washing surgeon's gloves and instruments during cancer operations. They can also be used to destroy the surface of ulcerating tumors.

The following examples are illustrative of the process and products of the present invention but are not to be construed as limiting. All percentages are by weight and all solvent mixture proportions are by volume unless otherwise noted.

EXAMPLE 1

A. Fermentation

A soil stock of *Streptomyces furlongus* var. *furlongus*, NRRL 3192, was used to inoculate 500-ml. Erlenmeyer flasks containing 100 ml. of sterile seed medium consisting of the following ingredients:

| | |
|---|---|
| Glucose monohydrate | 25 g. |
| Pharmamedia* | 25 g. |
| Tap water q.s. | 1 l. |

*Pharmamedia is an industrial grade of cottonseed flour produced by Trader's Oil Mill Company, Fort Worth, Texas.

The seed medium presterilization pH was 7.2. The seed inoculum was grown for 2 days at 28° C. on a Gump rotary shaker operating at 250 r.p.m.

The seed inoculum (5 ml.) was used to inoculate a 500-ml. Erlenmeyer fermentation flask containing 100 ml. of the following sterile fermentation medium:

| | |
|---|---|
| Glucose monohydrate | 20 g./l. |
| Kaysoy* | 10 g./l. |
| Pabst yeast | 2.5 g./l. |
| Ammonium sulfate $(NH_4)_2SO_4$ | 5 g./l. |
| KCL | 3 g./l. |
| Calcium carbonate | 4 g./l. |

| Tapwater | Balance |
|---|---|

*Kaysoy is a fat-extracted, finely milled, soybean meal.

The presterilization pH of the fermentation flask was 6.8. The fermentation cycle was 4 days during which time the flask was grown with incubation at 28° C. on a Gump rotary shaker operating at 250 r.p.m. The preharvest beer assayed 8 biounits/ml. on the KB cells in agar assay. The KB cells in agar assay procedure is as follows:

KB cells are grown in tissue culture and the cells are harvested and pooled every 48 hours. These pooled cells are uniformly dispersed into an agar-serum mixture at 45° C. and the agar mixture is poured rapidly into chromatography trays to about a 2-3 mm. depth. After the agar solidifies, dried paper discs, which were previously saturated with dimethylformamide solutions of the test compounds, are applied to the agar surface and the trays are inverted and incubated at 37° C. After 16 hours the agar surface is sprayed with a redox dye, sodium-2,6-dichlorophenol indophenol (DCIP), prepared in isotonic saline, and the cells are incubated for approximately 30 minutes at 37° C. In areas where the cells are either killed or severely inhibited by the material under test, the dye is at best only poorly reduced and a blue zone of inhibition is obtained. Where the cells are uneffected, good dye reduction is obtained and a colorless background is observed.

B. Carbon Absorption

The whole broth (500 liters assaying 13 biounits/ml.) from a scaled-up fermentation, as described above, was slurried with 5 percent of its weight of diatomaceous earth, filtered, and the cake washed with water. The filtered beer and wash (605 liters) was adjusted to pH 3.0 with 6 $N$ hydrochloric acid and passed through a column containing activated carbon. The carbon column was eluted with a 50 percent aqueous acetone solution. The aqueous acetone eluate (480 liters) was concentrated to an aqueous (15 liters) and freeze-dried to give 1903 g. of an impure preparation of cis-$\beta$-carboxyacrylamidine (I) assaying 1.2 biounits/mg. on the KB cells in agar assay.

C. Second Carbon Column Absorption

Nine hundred grams (900 g.) of cis-$\beta$-carboxyacrylamidine (I), obtained as above, was dissolved in water to a concentration of 30 mg./ml. The pH was adjusted to 5.0 with hydrochloric acid and the solution filtered to remove undissolved material. The filtrate was then passed through a column containing activated carbon (1.3 g. of carbon per g. of product) at a rate of 2 to 2.5 ml./gram of carbon/hour. The column was washed with deionized water (4 ml. of deionized water/gram of carbon). The carbon column was then eluted with the following eluants:

3 percent acetone in water (8 ml./gram of carbon)
12 percent acetone in water (15 ml./gram of carbon)
25 percent acetone in water (8 ml./gram of carbon)

Fractions, approximately equal to the column holdup volume, were collected, weighed, and assayed for bioactivity on the KB cells in agar assay. Fractions containing the highest specific gravity (usually in the 12 percent acetone eluate) were pooled and concentrated under reduced pressure to about 5 percent of the original volume at which time the cis-$\beta$-carboxyacrylamidine (I) crystallized from the concentrate. Cooling and further concentration of the solution yielded additional crystalline cis-$\beta$-carboxyacrylamidine (I). The crystalline product was washed first with cold water, then with cold ethanol, and finally air dried. From the 900 g. of starting material there was obtained 26.9 g. of crystalline cis-$\beta$-carboxyacrylamidine (I) assaying 13.7 biounits on the KB cells in agar assay.

D. Characterization of cis-$\beta$-carboxyacrylamidine (I)

Melting point: 223°-231° C.
Elemental analysis: Calcd. for $C_4H_6N_2O_2$: C, 42.10; H, 5.31; N, 24.56; O, 28.03.
Found: C, 41.93; H, 5.49; N, 23.88; O, 27.59.
Color: Crystals are colorless.
Optical activity: None Ultraviolet absorption spectrum: Maximum at 211 m$\mu$ with $\epsilon$ 10,550. (In $H_2O$).
Infrared absorption spectrum: Infrared spectrum in mineral oil mull shows major absorption bands at the following frequencies: 3,060, 1,725, 1,680 sh, 1,620, 1,580, 1,530, 1,510, 1,485, 1,335, 1,190, 885, 810, 775, and 755 cm.$^{-1}$.
Hydrolysis product: Alkaline hydrolysis with 1 $N$ sodium hydroxide solution releases ammonia and maleic acid.

EXAMPLE 2 trans-$\beta$-Carboxyacrylamidine

One gram (1 g.) of cis-$\beta$-carboxyacrylamidine, prepared as in example 1, in 25 ml. of 6 $N$ hydrochloric acid, was heated on the steam bath for 6 hours. The reaction mixture was adjusted to pH 4.5 with a 4 $N$ sodium hydroxide solution and allowed to stand overnight. The crystalline precipitate of trans-$\beta$-carboxyacrylamidine (II) was recovered by filtration; yield 464 mg. The characteristics of this compound are as follows:

Elemental analysis: Calcd. for $C_4H_6N_2O_2$: C, 42.10; H, 5.68; N, 24.5.
Found: C, 41.78; H, 5.71; N, 23.57.
Melting point: Decomposes above 280° C. without noticeable gas evolution.
Infrared absorption spectrum: The isomerization product when suspended in mineral oil mull gave the following major bands: 730, 755, 780, 1,145, 1,375, 1,505, 1,555, 1,600, 1,730, 2,680, 3,140 cm.$^{-1}$.
Hydrolysis product: Alkaline hydrolysis on a steam bath with 1 $N$ sodium hydroxide solution releases ammonia and fumaric acid.
Ultraviolet absorption spectrum: Maximum at 213 m$\mu$, with $\epsilon$ 11,514 (In $H_2O$).

The reaction mixture disclosed in example 2 contained cis- and trans-$\beta$-carboxyacrylamidine. Mixtures of cis- and trans-$\beta$-carboxyacrylamidine can be used for the same purposes as the components in environments where separation of the components is not advantageous.

We claim:

1. A compound selected from the class consisting of cis-$\beta$-carboxyacrylamidine of the formula:

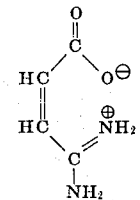

and pharmaceutically acceptable salts thereof.

2. cis-$\beta$-Carboxyacrylamidine.

3. A compound selected from the group consisting of cis-$\beta$-carboxyacrylamidine, and pharmaceutically acceptable salts thereof with alkali metals, alkaline earth metals, and amines.

4. A compound selected from the group consisting of cis-$\beta$-carboxyacrylamidine, according to claim 1, and pharmaceutically acceptable acid addition salts thereof.

5. A compound, as defined in claim 1, cis-$\beta$-carboxyacrylamidine, in its crystalline form.

6. A compound selected from the class consisting of trans-$\beta$-carboxyacrylamidine of the formula:

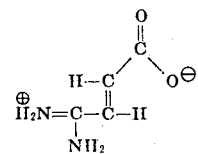

and pharmaceutically acceptable salts thereof.

7. trans-β-Carboxyacrylamidine.

8. A compound selected from the group consisting of trans-β-carboxyacrylamidine, and pharmaceutically acceptable salts thereof with alkali metals, alkaline earth metals, and amines.

9. A compound selected from the group consisting of trans-β-carboxyacrylamidine, according to claim 6, and pharmaceutically acceptable acid addition salts thereof.

10. A compound, as defined in claim 6, trans-β-carboxyacrylamidine, in its crystalline form.

11. A compound selected from the class consisting of cis-β-carboxyacrylamidine, trans-β-carboxyacrylamidine, and pharmaceutically acceptable salts thereof.

12. A composition of matter consisting of cis-β-carboxyacrylamidine and trans-β-carboxyacrylamidine.

* * * * *